United States Patent
Wang

(10) Patent No.: US 9,747,205 B2
(45) Date of Patent: Aug. 29, 2017

(54) METHOD FOR PROCESSING DATA AND ELECTRONIC DEVICE

(71) Applicant: Lenovo (Beijing) Co., Ltd., Beijing (CN)

(72) Inventor: Haiyang Wang, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 87 days.

(21) Appl. No.: 14/586,493

(22) Filed: Dec. 30, 2014

(65) Prior Publication Data

US 2015/0370703 A1 Dec. 24, 2015

(30) Foreign Application Priority Data

Jun. 23, 2014 (CN) .......................... 2014 1 0283472

(51) Int. Cl.
*G06F 12/06* (2006.01)

(52) U.S. Cl.
CPC ...... *G06F 12/0623* (2013.01); *G06F 12/0646* (2013.01)

(58) Field of Classification Search
CPC ...... G06F 3/06–3/0689; G06F 12/0623; G06F 11/14–11/1497; G06F 12/00–12/16; G06F 13/00–13/4295
See application file for complete search history.

(56) References Cited

U.S. PATENT DOCUMENTS

| | | | | |
|---|---|---|---|---|
| 5,809,552 A | * | 9/1998 | Kuroiwa | G06F 13/1615 710/107 |
| 2005/0216552 A1 | * | 9/2005 | Fineberg | G06F 12/0284 709/203 |
| 2006/0123202 A1 | * | 6/2006 | Popescu | G06F 11/1633 711/149 |
| 2006/0129739 A1 | * | 6/2006 | Lais | G06F 12/0653 711/5 |
| 2012/0131257 A1 | * | 5/2012 | Rudosky | G06F 15/7867 711/5 |
| 2013/0262964 A1 | * | 10/2013 | Winker | G06F 11/1004 714/807 |

* cited by examiner

*Primary Examiner* — Nicholas Simonetti
(74) *Attorney, Agent, or Firm* — Harness, Dickey & Pierce, P.L.C.

(57) ABSTRACT

A method for processing data and an electronic device are provided. The method includes: assigning first and second address sets in relation to data to be stored in a memory, a predetermined address offset is defined between the first address set and the second address set; writing the data to the first address set in response to a data write command; and reading the data from the second address set in response to a data read command.

8 Claims, 6 Drawing Sheets

| offset: | 0x04 | word 1 | 0x00 | word 0 |
|---|---|---|---|---|
| | 0x0C | word 1 | 0x08 | word 0 |
| | 0x14 | word 1 | 0x10 | word 0 |
| | 0x1C | word 1 | 0x18 | word 0 |
| | 0x24 | word 1 | 0x20 | word 0 |
| | 0x2C | word 1 | 0x28 | word 0 |
| | 0x34 | word 1 | 0x30 | word 0 |
| | 0x3C | word 1 | 0x38 | word 0 |

METHOD FOR PROCESSING DATA AND ELECTRONIC DEVICE

CROSS-REFERENCES TO RELATED APPLICATIONS

The present application claims the priority to Chinese Patent Application No. 201410283472.2, entitled "METHOD FOR PROCESSING DATA AND ELECTRONIC DEVICE", filed with the Chinese State Intellectual Property Office on Jun. 23, 2014, which is incorporated herein by reference in its entirety.

FIELD

The present disclosure relates to the technical field of data processing, and in particular to a method for processing data and an electronic device.

BACKGROUND

A data exchange intermediary is often used in hardware designing to implement a data exchange process between different types of objects. FIFO in hardware is generally the data exchange intermediary between software and hardware for performing data reading and writing. For example, data is written to the FIFO by software, a write pointer is adjusted automatically by hardware; the data is read from the FIFO by the hardware when the FIFO is non-null and the read pointer is adjusted; an interruption required by the software may be generated by the hardware based on the state of the FIFO or the state of the operation.

In accordance with one technique of FIFO, a width of the written data often exceeds a bus width of the hardware, leading to multiple times of data writing by the software and multiple times of adjustment of the write pointer upon data writing. The software need to readback the data in the FIFO after receiving the interruption, and the pointer need to be readjusted as the current pointer has jumped. After the readback operation, the pointer is readjusted again. Therefore, the read pointer and the write pointer have to be changed frequently, and thus an error rate in reading and writing of the FIFO increases.

SUMMARY

According to the embodiments of present disclosure, a method for processing data and an electronic device are provided.

In an aspect, it is provided a method for processing data, which includes: assigning first and second address sets in relation to data be stored in a memory of an electronic device, where a predetermined address offset is defined between the first and the second address sets; writing the data to the first address set in response to a data write command; and reading the data from the second address set in response to a data read command.

In another aspect, it is further provided an electronic device, which includes: a memory; a data address assigning unit, configured to assign first and second address sets in relation to data to be stored in the memory, where a predetermined address offset is defined between the first and second address sets, the first address set corresponds to a first data accessing mode, and the second address set corresponds to a second data accessing mode; a data writing unit, configured to write the data to the first address set in the first data accessing mode in response to a data write command; and a data reading unit, configured to read the data from the second address set in the second data accessing mode in response to a data read command.

BRIEF DESCRIPTION OF THE DRAWINGS

In order to more clearly illustrate the technical solutions in embodiments of the present disclosure, accompanying drawings referred to describe the embodiments are introduced simply hereinafter. Obviously, the accompanying drawings in the following description are just some embodiments of the present disclosure. For those skilled in the art, other accompanying drawings can also be obtained based on these accompanying drawings provided herein without any creative work.

DETAILED DESCRIPTION

The technical solutions in the embodiments of the present disclosure will be described hereinafter in conjunction with the drawings in the embodiments of the present disclosure. Apparently, the described embodiments are only a part of the embodiments of the present disclosure, rather than all embodiments. Based on the embodiments in the present disclosure, all other embodiments, made by those skilled in the art without any creative efforts, fall into the scope of protection of the present disclosure.

Figure 1:
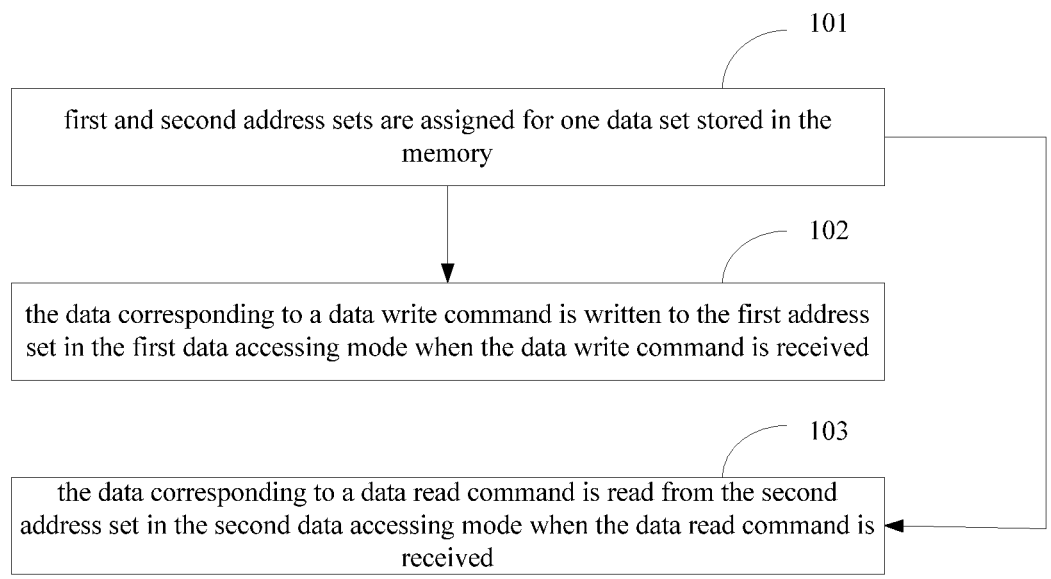
FIG. 1 is a flow chart of a method for processing data according to a first embodiment of the present disclosure.

Reference is made to FIG. 1, which is a flow chart of a method for processing data according to a first embodiment of the present disclosure. The method is applicable to an electronic device. The electronic device may be a pad, a notebook, a computer or the like, which transmits data between software and hardware via a data exchange intermediary. The electronic device includes a memory, which acts as the data exchange intermediary for providing data transmission between the software and the hardware of the electronic device. In the embodiment, the method may include the following steps 101 to 103.

In step 101, first and second address sets are assigned for one data set stored in the memory.

There is a predetermined address offset between the first address set and the second address set. That is to say, for data corresponding to each first address in the first address set, there is an address offset between the second address of the data in the second address set and the first address corresponding to the second address. It can also be understood that for each piece of data in the data sets, there is an address offset between the two addresses of the data in the first address set and the second address set. The base address of the first address set is different from that of the second address set, but the address lengths are identical and the pointed data are identical.

It is noted that the first address set corresponds to a first data accessing mode, and the second address set corresponds to a second data accessing mode.

In step 102, the data corresponding to a data write command is written to the first address set in the first data accessing mode when the data write command is received.

Specifically, in step 102, the data write command is generated when software in the electronic device is required to perform data writing. In response to the data write command, the electronic device writes the data corresponding to the data write command to the first address in the first address set in the first data accessing mode.

In step 103, the data corresponding to a data read command is read from the second address set in the second data accessing mode when the data read command is received.

Specifically, in step 103, the data read command is generated when hardware in the electronic device is required to perform data reading. In response to the data read command, the electronic device reads the data corresponding to the data read command from the second address set in the second data accessing mode.

That is to say, in the process of the electronic device writing the data in the data set, the data is written to an address in the first address set corresponding to the data set. And in the process of the electronic device reading the data in the data set, the data is read from an address in the second address set corresponding to the data set. In other words, in the electronic device, data reading and data writing performed by the software and the hardware are separated operations. The read pointer and the write pointer in the second address set are independent of that in the first address set. The data writing is performed in the first address set, and the data reading is performed in the second address set, thus it is not necessary to change the write pointer after the data writing is completed.

It can be seen from the solution described above, in the method for processing data according to the first embodiment of the present disclosure, writing data and reading data are separated by assigning different address sets for one data set in the memory. That is to say, writing is performed in the first address set, and reading is performed in the second address set, thereby the problem of the read pointer and the write pointer having to be changed frequently in readback operation, and thus an error rate of reading and writing operation is decreased.

Figure 2:
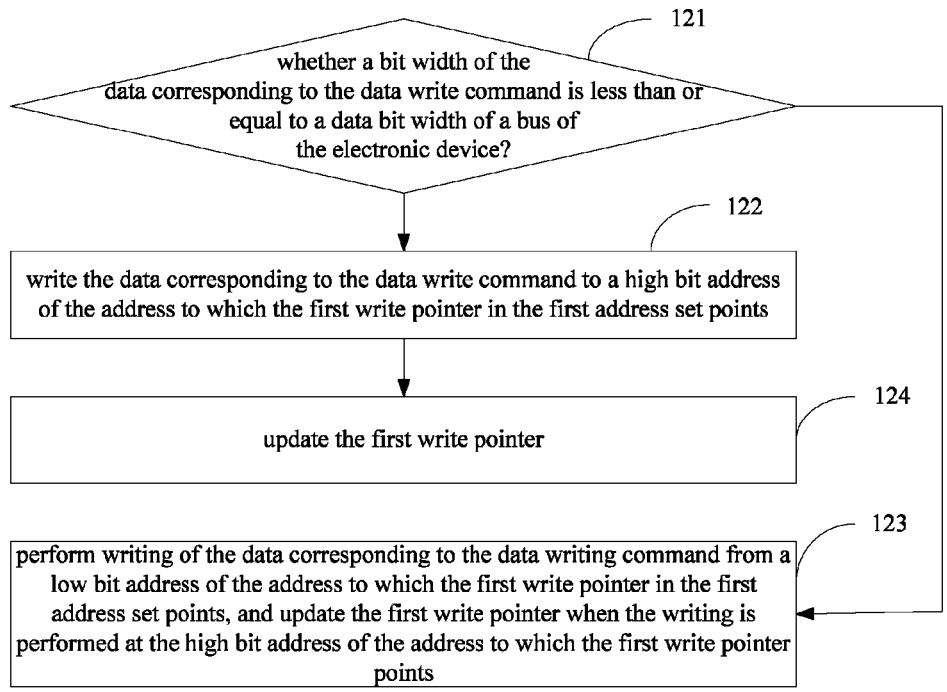
FIG. 2 is a part of a flow chart of a method for processing data according to a second embodiment of the present disclosure.

In the implementation described above, the first data accessing mode may be an FIFO (First In First Out) mode. That is to say, in the first address set, data writing or reading is based on an order in which the data was stored, i.e., the previously stored data is read earlier, and the subsequently stored data is read later. Reference is made to FIG. 2, which is a flow chart of step 102 in the method for processing data according to a second embodiment of the present disclosure. Step 102 may include the following steps 121 to 124.

In step 121, it is determined whether a bit width of the data corresponding to the data write command is less than or equal to a data bit width of a bus of the electronic device. Step 122 is performed if the bit width of the data corresponding to the data write command is less than or equal to the data bit width of the bus of the electronic device. Step 123 is performed if the bit width of the data corresponding to the data write command is greater than the data bit width of the bus of the electronic device.

For example, the data bit width of the data bus is 32 bites (1 word), and the bit width of the memory is 2 words (64 bites).

In step 122, the data corresponding to the data write command is written to a high bit address of the address to which the first write pointer in the first address set points, and step 124 is performed.

In step 124, the first write pointer is updated.

Figure 3:
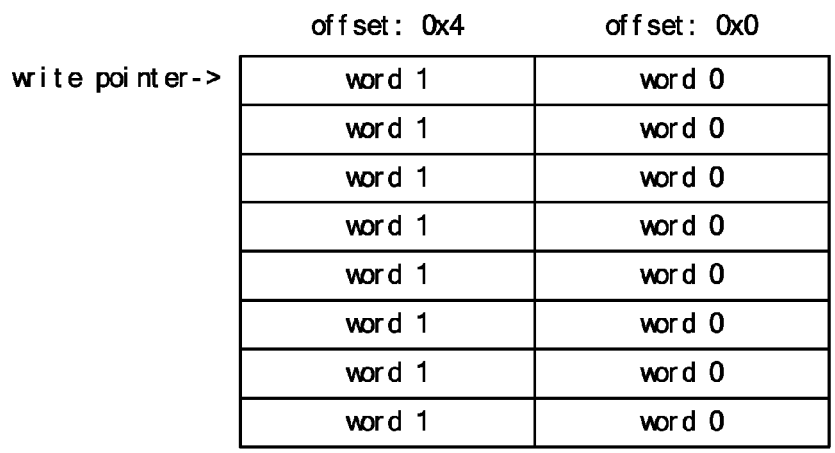
FIG. 3 and FIG. 4 are diagrams of an application example according to the second embodiment of the present disclosure.
Figures 4, 5:
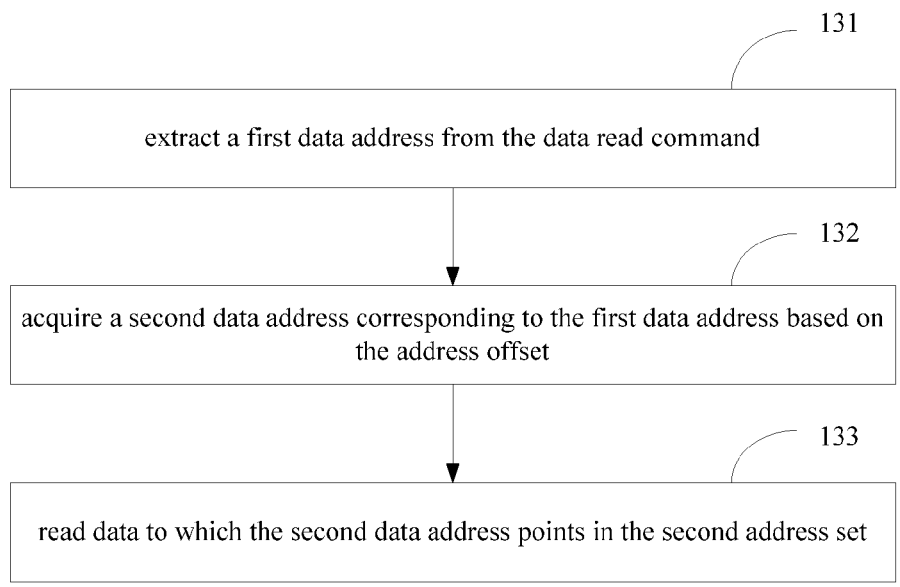
FIG. 5 is a part of a flow chart of a method for processing data according to a third embodiment of the present disclosure.

Take an example of the first address set illustrated in FIG. 3 and the second address set illustrated in FIG. 4. There is an offset of 0x001 0000 between each address in the first address set and the address in the second address set corresponding to the address in the first address set. The data bit width is 2 words in the first address set. The first write pointer points to the current address word 1 and word 0, which have an offset of 0x04 and 0x00 respectively from the base address of the first address set. The data is written to a high bit address of the first write pointer if the writing bit width is less than or equal to the data bit width of the electronic device. The first write pointer is then adjusted to point to the next address to be written according to the FIFO mode.

In step 123, writing of the data corresponding to the data write command from a low bit address of the address to which the first write pointer in the first address set points is performed.

The first write pointer is updated when the writing is performed at the high bit address of the address to which the first write pointer points.

It is noted that in step 123, the first write pointer may be updated only when the writing is performed at the high bit address of the first write pointer. That is to say, in data writing operation, each time when writing data, the first write pointer is updated only when the writing is performed at the high bit address of the first write pointer. If the high bit address is not written, the write pointer is not updated no matter how many times the writing is performed at the low bit address. Therefore, the write pointer can be adjusted even if the address to which the pointer points is not fully written, leading to more flexibility in pointer adjustment and enhanced robustness of the electronic device.

The second data accessing mode may be a memory mode. That is to say, in the second address set, the operation of reading or writing of the data is independent of the order in which the data is stored in the address. Reference is made to FIG. 5, which is a flow chart of step 103 of the method for processing data according to a third embodiment of the present disclosure. Step 103 may be implemented by the following steps 131 to 133.

In step 131, a first data address is extracted from the data reading command.

When the hardware performs data reading, the address of the data to be read in the generated data read command is the first data address in the first address set.

In step 132, a second data address corresponding to the first data address is acquired based on the address offset.

In the embodiment, the data is required to be read from the second address set. For this reason, in step 132, the address in the second address set corresponding to the data to be read is to be acquired firstly based on the offset.

More particularly, as discussed above, the first address set is obtained by shifting the second address set by an offset. Step 132 may be implemented as follows.

The second data address corresponding to the first data address in the second address set is obtained by calculating a sum of the first data address and the address offset.

In step 133, data to which the second data address points in the second address set is read.

Figure 6:
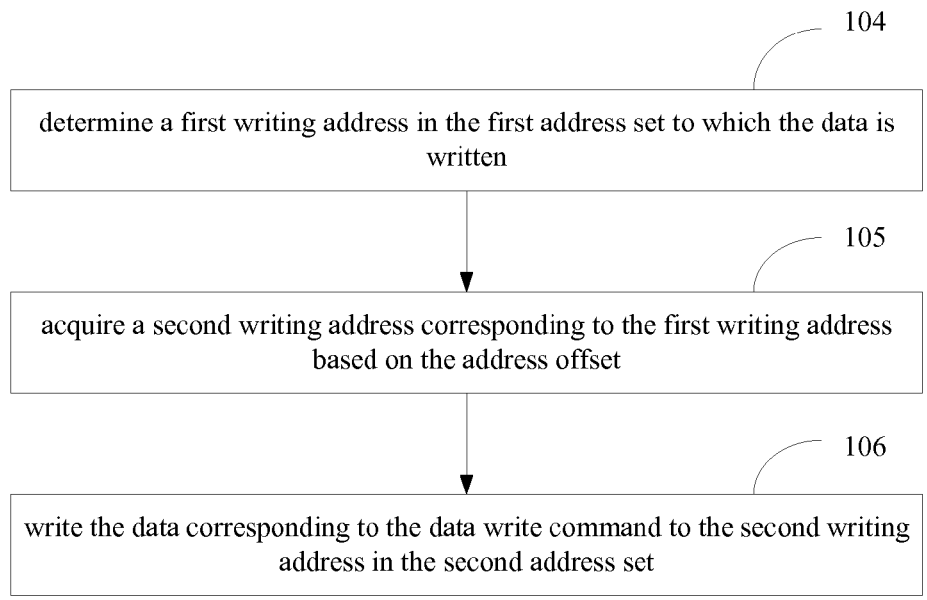
FIG. 6 is a part of a flow chart of a method for processing data according to a fourth embodiment of the present disclosure.

As can be seen, the first address set and the second address set point to the same data. Therefore, after the data is written to the first address set, the data corresponding to the second address set is synchronized. Reference is made to FIG. 6, which is a part of a flow chart of a method for processing data according to a fourth embodiment of the present disclosure. After step 102, the method may further include the following steps 104 to 106.

In step 104, a first writing address in the first address set to which the data is written is determined.

The first writing address may be interpreted as an address in the first address set to which the first write pointer points before the data is written to, i.e., the address to which the data is written.

In step 105, a second writing address corresponding to the first writing address is acquired based on the address offset.

In step 106, the data corresponding to the data write command is written to the second writing address in the second address set.

The data corresponding to the data write command is the data corresponding to the first writing address in the first address set. Therefore, after step 6, the data corresponding to the first address set is the same as the data corresponding to the second address set, and thus the data synchronization is achieved.

Figure 7:
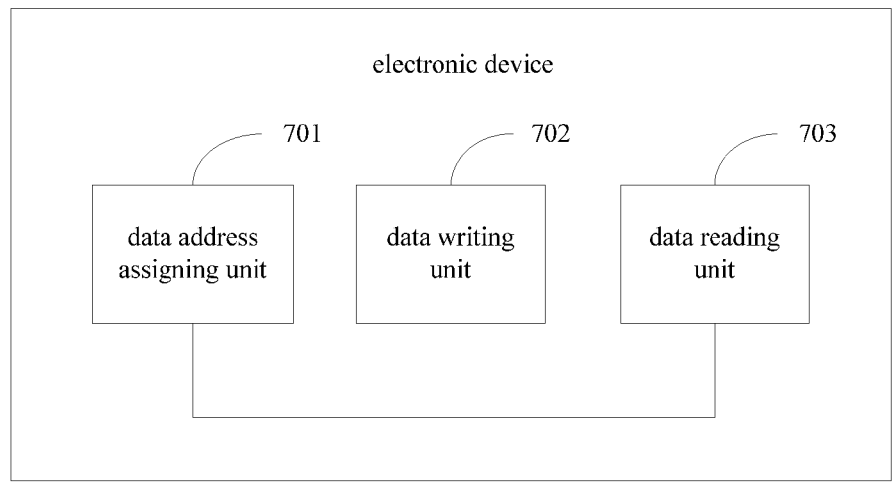
FIG. 7 is a schematic structural diagram of an electronic device according to a fifth embodiment of the present disclosure.

Reference is made to FIG. 7, which is a schematic structural diagram of an electronic device according to a fifth embodiment of the present disclosure. The electronic device may be a pad, a notebook, a computer or the like, which transmits data between software and hardware via a data exchange intermediary. The electronic device includes a memory, which acts as the data exchange intermediary for providing data transmission between software and hardware of the electronic device. In the embodiment, the electronic device may further include a data address assigning unit 701, a data writing unit 702 and a data reading unit 703 as follows.

The data address assigning unit 701 is configured to assign different address sets for one data set stored in the memory, such that the data sets correspond to a first address set and a second address set.

There is a predetermined address offset between the first address set and the second address set. That is to say, for data corresponding to each first address in the first address set, there is an address offset between the second address of the data in the second address set and the first address corresponding to the second address. It can also be understood that for each piece of data in the data sets, there is an address offset between the two addresses of the data in the first address set and the second address set. The base address of the first address set is different from that of the second address set, but the address lengths are identical and the pointed data are identical.

It is noted that the first address set corresponds to a first data accessing mode, and the second address set corresponds to a second data accessing mode.

The data writing unit 702 is configured to write the data corresponding to a data write command to the first address set in the first data accessing mode when the data write command is received.

Specifically, the data writing unit 702 may be configured to generate a data write command when software in the electronic device is required to perform data writing. In response to the data write command, the electronic device writes the data corresponding to the data write command to the first address in the first address set in the first data accessing mode.

The data reading unit 703 is configured to read the data corresponding to a data read command from the second address set in the second data accessing mode when the data read command is received.

Specifically, the data reading unit 703 may be configured to generate a data read command when hardware in the electronic device is required to perform data reading. In response to the data read command, the electronic device reads the data corresponding to the data read command from the second address set in the second data accessing mode.

That is to say, in the process of the electronic device writing the data in the data set, the data writing unit 702 writes the data to an address in the first address set corresponding to the data set. And in the process of the electronic device reading the data in the data set, the data reading unit 703 reads the data from an address in the first address set corresponding to the data set. In other words, in the electronic device, data reading and data writing performed by the software and the hardware are separated operations. The read pointer and the write pointer in the second address set are independent of that in the first address set. The data writing is performed in the first address set, and the data reading is performed in the second address set, thus it is not necessary to change the write pointer after the data writing is completed.

It can be seen from the solution described above, in the electronic device according to the fifth embodiment of the present disclosure, writing data and reading data are separated by assigning different address sets for one data set in the memory. That is to say, writing is performed in the first address set, and reading is performed in the second address set, thereby the problem of the read pointer and the write pointer having to be changed frequently in readback operation, and thus an error rate of reading and writing operation is decreased.

Figure 8:
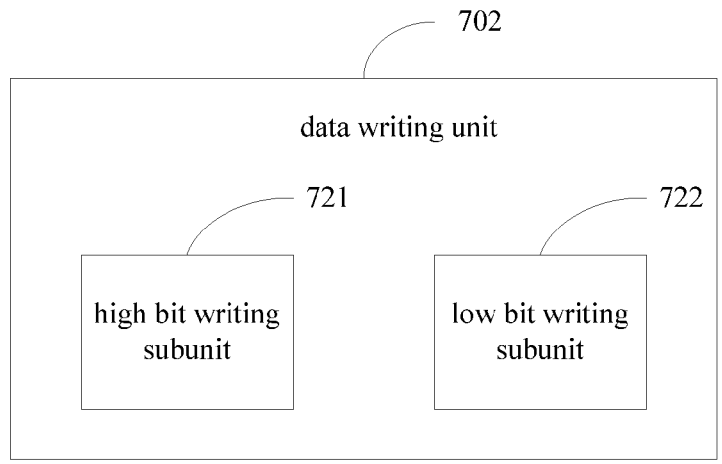
FIG. 8 is a part of a schematic structural diagram of an electronic device according to a sixth embodiment of the present disclosure.

In the implementation described above, the first data accessing mode may be a FIFO (First In First Out) mode. That is to say, in the first address set, data writing or reading is based on an order in which the data was stored, i.e., the previously stored data is read earlier, and the subsequently stored data is read later. Reference is made to FIG. 8, which is a schematic structural diagram of a data writing unit 702 of an electronic device according to a sixth embodiment of the present disclosure. The data writing unit 702 may include a high bit writing subunit 721 and a low bit writing subunit 722 as follows.

The high bit writing subunit 721 is configured to write the data corresponding to the data write command to a high bit address of the address to which the first write pointer in the first address set points if a bit width of the data corresponding to the data writing command is less than or equal to a data bit width of a bus of the electronic device, and update the first write pointer.

In the embodiment of the present disclosure, for example, the data bit width of the data bus is 32 bites (1 word), and the bit width of the memory is 2 words (64 bites).

Take an example of the first address set illustrated in FIG. 3 and the second address set illustrated in FIG. 4. There is an offset of 0x001 0000 between each address in the first address set and the address in the second address set corresponding to the address in the first address set. The data bit width is 2 words in the first address set. The first write pointer points to the current address word 1 and word 0, which have an offset of 0x04 and 0x00 respectively from the base address of the first address set. The data is written to a high bit address of the first write pointer by the high bit writing subunit 721 if the writing bit width is less than or equal to the data bit width of the electronic device. The first write pointer is then adjusted to point to the next address to be written according to the FIFO mode.

The low bit writing subunit 722 is configured to perform writing of the data corresponding to the data write command from a low bit address of the address to which the first write pointer in the first address set points if a bit width of the data corresponding to the data write command is greater than a data bit width of a bus of the electronic device, and updating the first write pointer when the writing is performed at the high bit address of the address to which the first write pointer points.

The first write pointer is updated when the writing is performed at the high bit address of the address to which the first write pointer points.

It is noted that the low bit writing subunit 722 is configured to update the first write pointer only when the writing is performed at the high bit address of the first write pointer. That is to say, in data writing operation, each time when writing data, the first write pointer is updated only when the writing is performed at the high bit address of the first write pointer. If the high bit address is not written, the write pointer is not updated no matter how many times the writing is performed at the low bit address. Therefore, the write pointer can be adjusted even if the address to which the pointer points is not fully written, leading to more flexibility in pointer adjustment and enhanced robustness of the electronic device.

Figure 9:
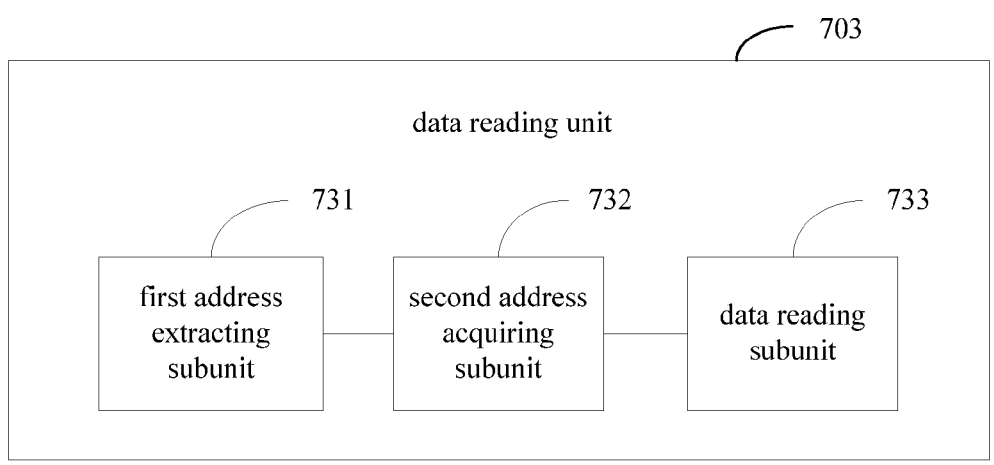
FIG. 9 is a part of a schematic structural diagram of an electronic device according to a seventh embodiment of the present disclosure.

The second data accessing mode may be a memory mode. That is to say, in the second address set, the operation of reading or writing of the data is independent of the order in which the data is stored in the address. Reference is made to FIG. 9, which is a schematic structural diagram of a data reading unit 703 of an electronic device according to a seventh embodiment of the present disclosure. The data reading unit 703 may include a first address extracting subunit 731, a second address acquiring subunit 732 and a data reading subunit 733 as follows.

The first address extracting subunit 731 is configured to extract a first data address from the data reading command.

When the hardware performs data reading, the address of the data to be read in the generated data read command is the first data address in the first address set.

The second address acquiring subunit 732 is configured to acquire a second data address corresponding to the first data address based on the address offset.

In the embodiment, the data is required to be read from the second address set. For this reason, in step 132, the address in the second address set corresponding to the data to be read is to be acquired firstly based on the offset.

Figure 10:
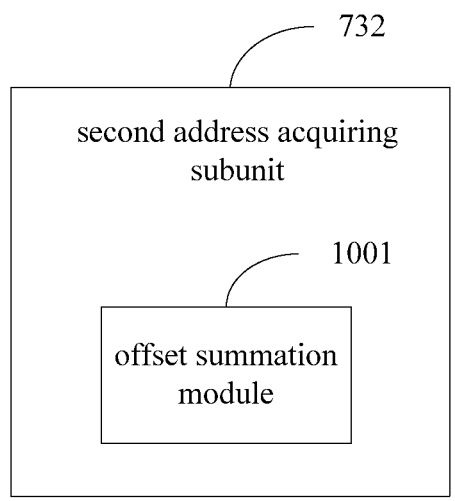
FIG. 10 is another part of a schematic structural diagram of the seventh embodiment of the present disclosure.

Reference is made to FIG. 10, which is an implementation schematic structural diagram of a second address acquiring subunit 732 of an embodiment of the present disclosure. The second address acquiring subunit 732 may include an offset summation module 1001.

The offset summation module 1001 is configured to obtain the second data address corresponding to the first data address in the second address set by calculating a sum of the first data address and the address offset.

The data reading subunit 733 is configured to read data to which the second data address points in the second address set.

Figure 11:
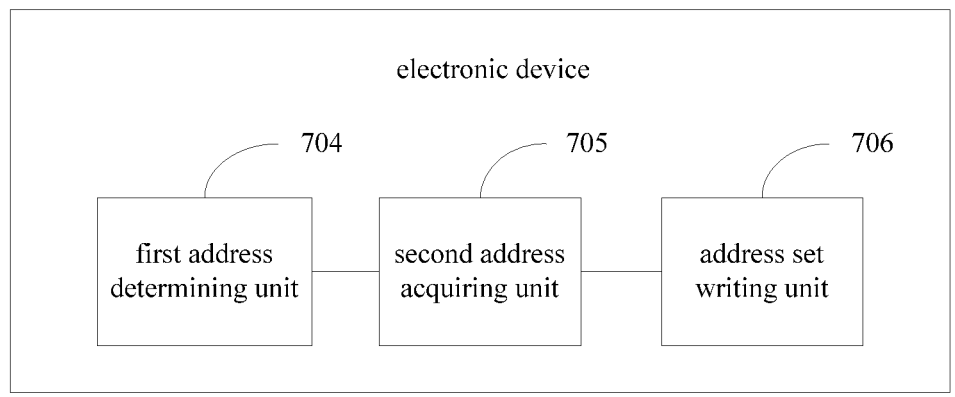
FIG. 11 is a part of a schematic structural diagram of an electronic device according to an eighth embodiment of the present disclosure.

As can be seen, the first address set and the second address set point to the same data. Therefore, after the data is written to the first address set, the data corresponding to the second address set is synchronized. Reference is made to FIG. 11, which is a part of a schematic structural diagram of an electronic device according to an eighth embodiment of the present disclosure. The electronic device may further include a first address determining unit 704, a second address acquiring unit 705 and a address set writing unit 706 as follows.

The first address determining unit 704 is configured to determine a first writing address in the first address set to which the data is written after the data writing unit writes the data corresponding to a data write command to the first address set.

The first writing address may be interpreted as an address in the first address set to which the first write pointer points before the data is written to, i.e., the address to which the data is written.

The second address acquiring unit 705 is configured to acquire a second writing address corresponding to the first writing address based on the address offset.

The address set writing unit 706 is configured to write the data corresponding to the data write command to the second writing address in the second address set.

The data corresponding to the data write command is the data corresponding to the first writing address in the first address set. Therefore, after writing the data corresponding to the data write command to the second writing address in the second address set by the address set writing unit 706, the data corresponding to the first address set is the same as the data corresponding to the second address set is the same, and thus the data synchronization is achieved.

The embodiments of the present disclosure are described herein in a progressive manner, with the emphasis of each of the embodiments on the difference between it and the other embodiments; hence, for the same or similar parts between the embodiments, one can refer to the other embodiments.

Finally, it should further be noted that, herein, a relationship term such as "a first" and "a second" is only used to distinguish one entity or operation from another entity or operation, but does not necessarily require or imply that there is such actual relationship or order between these entities or operations. Moreover, the term "comprising", "including" or any other variant thereof are intended to cover a non-exclusive inclusion, so that a process, method, article or device including a series of elements not only includes those elements but also includes other elements which are not explicitly listed, or also includes inherent elements for such process, method, article or device. In the case there is no more restriction, the element defined by the statement "includes a . . . " does not exclude that there is other same element in the process, method, article or device including said element.

A method for processing data and an electronic device provided by the present disclosure is described above in detail. The principle and the embodiments of the present disclosure are set forth by specific examples. The description of the embodiments is only to facilitate understanding the method and the core concept of the present disclosure. Various changes can be made to by those skilled in the art to the detailed embodiments and the scope of applicable field on the basis of the concept of the present disclosure. Therefore, the content of the description should not be construed as a limitation to the scope of the present disclosure.

The invention claimed is:

1. A method for processing data, comprising:
assigning first and second address sets in relation to data to be stored in a memory of an electronic device, wherein a predetermined address offset is defined between the first and the second address sets;
the first address set corresponds to a first data accessing mode, and the second address set corresponds to a second data accessing mode;
writing the data to the first address set in the first data accessing mode in response to a data write command; and
reading the data from the second address set in the second data accessing mode in response to the data read command,
wherein the data is only read from the second address set;
wherein the writing the data to the first address set in the first data accessing mode comprises:
writing the data to a high bit address of an address to which a write pointer in first address set points if a bit width of the data corresponding to the data write command is less than or equal to a data bit width of a bus of the electronic device, and updating the write pointer; and
writing the data from a low bit address of the address to which the write pointer in the first address set points if a bit width of the data corresponding to the data write command is greater than a data bit width of the bus of the electronic device, and updating the write pointer when the writing is performed at the high bit address of the address to which the write pointer points.

2. The method according to claim 1, wherein the reading the data from the second address set in the second data accessing mode comprises:
extracting a first data address from the data read command;
acquiring a second data address corresponding to the first data address based on the address offset; and
reading data in relation to the second data address from the second address set.

3. The method according to claim 2, wherein acquiring the second data address comprises:
obtaining the second data address by calculating a sum of the first data address and the address offset.

4. The method according to claim 1, wherein, after writing the data to the first address set in the first data accessing mode, the method further comprises:
determining a first writing address in the first address set to which the data is written;
acquiring a second writing address corresponding to the first writing address based on the address offset; and
writing the data corresponding to the data write command to the second writing address in the second address set.

5. An electronic device comprising:
a memory;
a data address assigning unit, configured to assign first and second address sets in relation to data to be stored in the memory, wherein a predetermined address offset is defined between the first and second address sets, the first address set corresponds to a first data accessing mode, and the second address set corresponds to a second data accessing mode;
a data writing unit, configured to write the data to the first address set in the first data accessing mode in response to a data write command; and
a data reading unit, configured to read the data from the second address set in the second data accessing mode in response to a data read command,
wherein the data is only read from the second address set;
wherein the data writing unit is configured to:
write the data corresponding to the data write command to a high bit address of an address to which a write pointer in first address set points if a bit width of the data corresponding to the data write command is less than or equal to a data bit width of a bus of the electronic device, and update the write pointer; and
write the data corresponding to the data write command from a low bit address of the address to which the write pointer in the first address set points if a bit width of the data corresponding to the data write command is greater than a data bit width of the bus of the electronic device, and update the write pointer when the writing is performed at the high bit address of the address to which the write pointer points.

6. The electronic device according to claim 5, wherein the data reading unit is configured to:
extract a first data address from the data read command;
acquire a second data address corresponding to the first data address based on the address offset; and
read data in relation to the second data address from the second address set.

7. The electronic device according to claim 6, wherein the data reading unit is configured to obtain the second data address corresponding to the first data address in the second address set by calculating a sum of the first data address and the address offset.

8. The electronic device according to claim 5, wherein the data writing unit is configured to:
determine a first writing address in relation to the first address set to which the data is written after the data is written thereto;
acquire a second writing address corresponding to the first writing address based on the address offset; and
write the data corresponding to the data write command to the second writing address in the second address set.

* * * * *